US012450292B2

(12) United States Patent
Arefaine et al.

(10) Patent No.: US 12,450,292 B2
(45) Date of Patent: Oct. 21, 2025

(54) DOCUMENT SET INTERROGATION TOOL

(71) Applicant: Wells Fargo Bank, N.A., San Francisco, CA (US)

(72) Inventors: Fanus Arefaine, San Jose, CA (US); Michael Paul Bortis, Tustin, CA (US); Narsingh Rao Chatla, Hyderabad (IN); Austin Lee Grelle, Riverside, IL (US); Siddharth Jain, Bengaluru (IN); Guangcao Ji, Plano, TX (US); Anara Myrzabekova, San Francisco, CA (US); Winthrop Treynor Smith, Littleton, CO (US); Manesh Saini, New York, NY (US); Yashjeet Singh, Bengaluru (IN); Ronald Louis Sobey, Porter, TX (US); Pradyut K. Parida, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/601,102

(22) Filed: Mar. 11, 2024

(65) Prior Publication Data

US 2025/0284742 A1    Sep. 11, 2025

(51) Int. Cl.
*G06F 16/90* (2019.01)
*G06F 16/9032* (2019.01)

(52) U.S. Cl.
CPC .............................. *G06F 16/90332* (2019.01)

(58) Field of Classification Search
CPC ........... G06F 16/90332; G06F 16/3347; G06F 16/338; G06F 16/24569; G06F 16/3329; G06F 16/90324; G06F 16/335; G06Q 30/0625; G06Q 30/0633; G06Q 30/0641

USPC .............. 707/766, 603, 708, 709, 722, 776, 707/999.003, E17.109, 693, 728, 737, 707/741, 769
See application file for complete search history.

(56) References Cited

U.S. PATENT DOCUMENTS

| | | |
|---|---|---|
| 11,145,289 B1 | 10/2021 | Graham et al. |
| 11,397,762 B2 | 7/2022 | Raval Contractor et al. |
| 11,405,338 B2 | 8/2022 | Truong et al. |
| 11,449,556 B2 | 9/2022 | Jawagal et al. |
| 11,663,255 B2 | 5/2023 | Joko et al. |
| 11,676,044 B1 * | 6/2023 | Mazza ................... G06N 5/043 706/11 |
| 2021/0174016 A1 | 6/2021 | Fox et al. |
| 2021/0295203 A1 | 9/2021 | Liao et al. |
| 2023/0074406 A1 | 3/2023 | Baeuml et al. |
| 2023/0135179 A1 | 5/2023 | Mielke et al. |
| 2023/0139831 A1 * | 5/2023 | Wang ................. G06V 30/1444 704/9 |

(Continued)

OTHER PUBLICATIONS

Yang, Wei, Zhang, Haotian, and Lin, Jimmy, Simple Applications of BERT for Ad Hoc Document Retrieval, David R. Cheriton School of Computer Science, University of Waterloo, arXiv: 1903.10972v1 [cs.IR] Mar. 26, 2019.

*Primary Examiner* — Md I Uddin
(74) *Attorney, Agent, or Firm* — Merchant & Gould P.C.

(57) ABSTRACT

Disclosed herein is a workflow for a chatbot system based on an ad hoc set of documents. The chatbot enables users to ask questions of these documents. The workflow then searches for relevant information and generates a response. The response may include an answer to a question and a relevant section of a document.

8 Claims, 6 Drawing Sheets

(56) References Cited

U.S. PATENT DOCUMENTS

| | | |
|---|---|---|
| 2023/0205824 A1 | 6/2023 | Jablokov et al. |
| 2023/0252224 A1 | 8/2023 | Tran |
| 2023/0252233 A1 | 8/2023 | Gutierrez et al. |
| 2023/0259705 A1 | 8/2023 | Tunstall-Pedoe et al. |
| 2023/0259821 A1 | 8/2023 | Travalini et al. |

* cited by examiner

Chat [restart]

200

```
import math
def sqrt(number):
    return math.sqrt(numner)
```

You can use this funstion by calling it with the desired input, like this:

```python
result = sqrt(25)
print(result) # Outputs 5.0
```

234

Write me a function that computes the square root of an input number. 236

Here's a Python function that calculates the square root of a given number using the Newton-Raphson method: ''' python def sqrt(x): if x < 0: return None guess = x / 2 while abs(guess2 - x) > 1e-8: guess = (guess + x/guess) / 2 return guess ''' Explanation: - The function first checks whether the input number is negative, and returns None if it is. - It then initializes a guess to be half of the input number. - It iteratively updates the guess using the formula '(guess + x/guess) / 2', which comes from applying the derivative of x^2 - y' with respect to x at x=y (which is equal to 2y). This formula converges quadratically to the square root of 'x'. - The loop continues until the derivative between 'guess2' and 'x' is less than '1e-8', which is a reasonable numerical tolerance for floating point arithmetic. To use this function, simply call it with a nonnegative number as its argument: ''' python >>> sqrt(2) 1.4142135623730951 >>> sqrt(10) 238

Send a message or click an option from chat

Enter your message here

206

[Submit]

FIG. 6

DOCUMENT SET INTERROGATION TOOL

BACKGROUND

Chatbots are tools or systems of tools that can be used to provide answers, fulfill tasks, or obtain information from users of various services. In an ideal scenario, a chatbot can be implemented to provide these services without customer wait time, off hours, or uneven service levels from different human representatives.

However, in their current form, many chatbots can be frustrating to use because they lack the ability to properly handle many types of requests. For example, a user may have questions relating to a set of one or more documents which a chatbot will be unable to satisfactorily search. In such a scenario, a user would then be required to manually search one or more lengthy documents and/or seek out another employee with more knowledge whose time could be better used carrying out other tasks.

SUMMARY

According to a first aspect, a method described herein includes: a) receiving a query via a user interface; b) embedding text of the query into one or more vectors; c) comparing the one or more vectors from the query with one or more vectors generated from a document; d) selecting a chunk of the document based on the comparing; e) constructing a prompt to a large language model including the query and the chunk of the document; f) receiving a response to the prompt from the large language model; and g) presenting the response on the user interface along with the chunk of the document.

Comparing the one or more vectors from the query with one or more vectors generated from a document can include generating a score for each of the one or more vectors generated from the document based on a relevance of each of the one or more vectors generated from the document to the one or more vectors from the query. Selecting a chunk of the document based on the comparison can include selecting the chunk including the vector having a highest score. Presenting the chunk of the document on the user interface can include presenting an icon representing the document on the user interface adjacent to the response and the text of the chunk can be displayed in response to selection of the icon. The method can include receiving an upload of a document along with the query. The method can include parsing the document into text, splitting the text into chunks and embedding the chunks into the one or more vectors generated from the document. The method can include retrieving the document from a database of documents.

According to a second aspect, a system described herein can include a chatbot system communicatively coupled to a user interface to receive a query therefrom and a web server communicatively coupled to both the user interface and the chatbot system. The web server can be configured to process a query submitted via the user interface to generate one or more vectors representing the query and to compare the one or more vectors from the query with one or more vectors generated from a document to select a chunk of the document based on the comparison. The system can further include a large language model configured to receive a prompt including the query and the chunk of the document and to provide a response to the query to the web server. The web server can be configured to provide the response from the large language model and the chunk of the document to the chatbot system for presentation on the user interface in response to the query.

The web server can further include a scoring module configured to generate a score for each of the one or more vectors generated from the document based on a relevance of each of the one or more vectors generated from the document to the one or more vectors from the query. The chatbot system can be configured to receive an upload of the document via the user interface when the query is submitted. The system can include a document database from which the web server can retrieve the document. The user interface to which the chatbot system is communicatively coupled can be a graphical user interface. the chatbot can interface with a chat log on the graphical user interface for presenting the query and the response.

A system according to a third aspect disclosed herein can include a processor and a computer-readable medium. The computer-readable medium can store instructions that, when executed by the processor, cause the system to: a) receive a query via a user interface; b) embed text of the query into one or more vectors; c) compare the one or more vectors from the query with one or more vectors generated from a document; d) select a chunk of the document based on the comparison; e) construct a prompt to a large language model including the query and the chunk of the document; f) receive a response to the prompt from the large language model; and g) present the response on the user interface along with the chunk of the document.

Comparing the one or more vectors from the query with one or more vectors generated from a document can include generating a score for each of the one or more vectors generated from the document based on a relevance of each of the one or more vectors generated from the document to the one or more vectors from the query. Selecting a chunk of the document based on the comparison can include selecting the chunk including the vector having a highest score. Presenting the chunk of the document on the user interface can include presenting an icon representing the document on the user interface adjacent to the response and displaying text of the chunk in response to selection of the icon. The computer-readable medium can further include instructions that, when executed by the processor, cause the system to be configured to receive an upload of a document along with the query. The computer-readable medium can further include instructions that, when executed by the processor, cause the system to parse the document into text, split the text into chunks and embed the chunks into the one or more vectors generated from the document. The computer-readable medium can further include instructions that, when executed by the processor, cause the system to retrieve the document from a database of documents.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Employees of an organization may have questions regarding various policies and procedures that must be followed to carry out a task for the organization. There will often be a number of lengthy documents that would need to be consulted for an employee to determine an answer to such questions. The process can therefore be time-consuming, and the employee may not even be able to find an answer. In the context of a banking employee, such questions may include whether preclearance is needed for certain trades.

Chatbot systems exist that can aid in answering user questions, but such systems can frustrate those who must interact with them by failing to efficiently accomplish a desired objective. Such systems are not currently capable of adequately searching one or more lengthy documents to efficiently provide answers that employees might have as set forth above.

Disclosed herein is a workflow for a chatbot based on an ad hoc set of documents. The chatbot enables users to ask questions of these documents. The workflow then searches for relevant information and generates a response. One exemplary chatbot system that can be utilized with the workflow disclosed herein is disclosed in U.S. patent application Ser. No. 18/582,921, entitled Clarifying Policy Contextual Extractive Chatbot, which is hereby incorporated herein by reference in its entirety.

The drawings depict elements of this disclosure for a more complete understanding of the document interrogation tool using a chatbot system.

Figure 1:
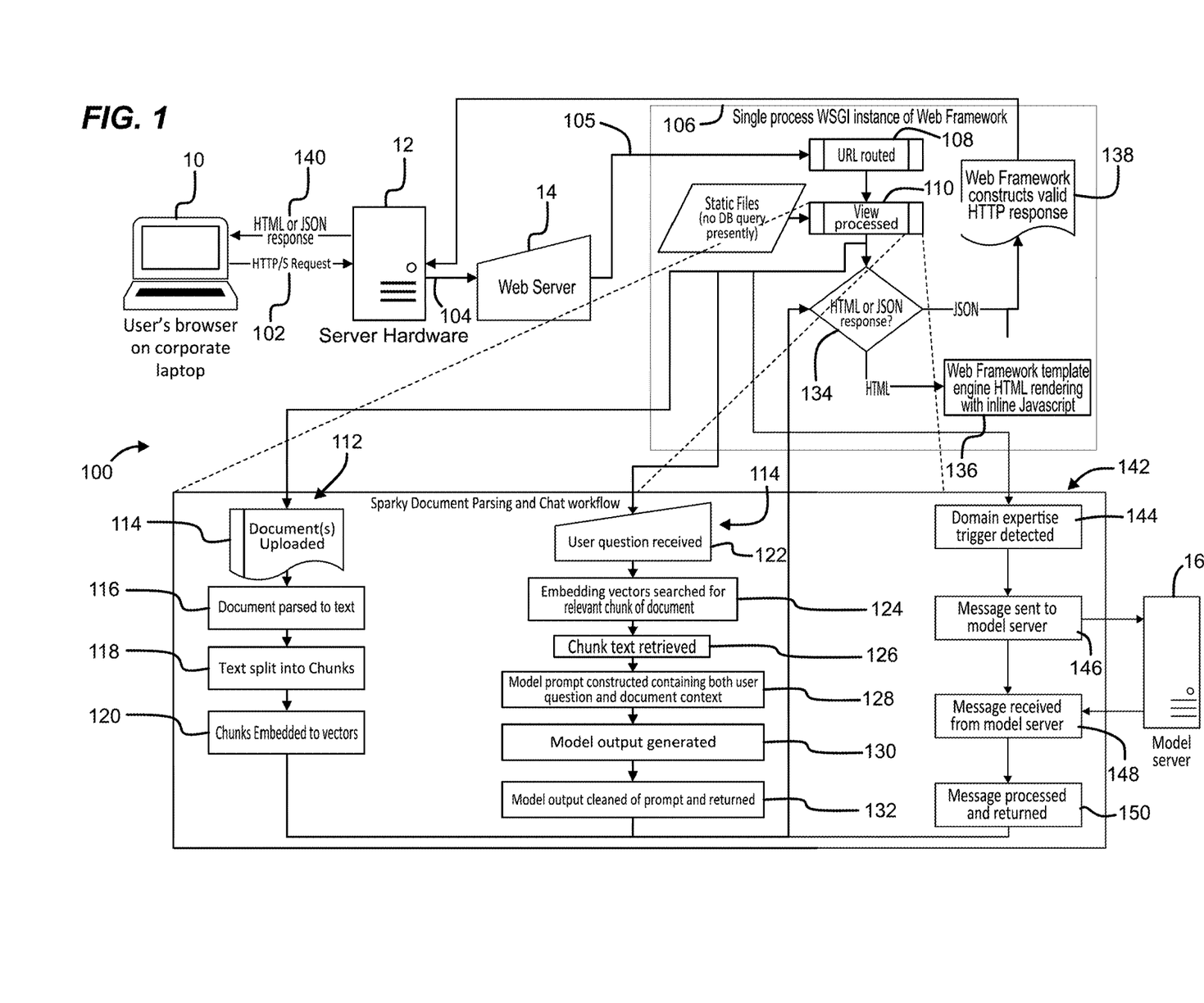
FIG. 1 depicts an example system implementing a workflow for a document interrogation tool.

An exemplary system and workflow for a document set interrogation tool using a chatbot system 100 is depicted in FIG. 1. The workflow can be initiated from a user device 10, such as a user computing device operating a web browser. The web browser can be employed to initiate a secure user request that at step 102 is transmitted to hardware such as a computing device 12, such as, for example, a desktop computer operating on a local area network (LAN). As will be described in more detail below, a graphical user interface of a chatbot system operating on web browser can be used to initiate the user request. The computing device 12 passes the request to a web server 14, such as, for example, a Python web server, at step 104. In other embodiments, the user device 10 may interact directly with the web server 14 such that there is no intermediate computing device 12.

The web server 14 proceeds at step 105 to carry out a web server processing routine 106 of the user request using a web server gateway interface (WSGI). This routine can include the Uniform Resource Locator (URL) of the request being routed to the web server 14 at step 108 and processing of the request being initiated at step 110. The processing routine 106 can include a document parsing routine 112 (if a document is uploaded with the user request) and a chat workflow routine 114.

The document parsing routine 112 can begin with uploading of a document at step 114. The document is parsed into text at step 116. The text can then be split into chunks, i.e., broken down into smaller pieces, at step 118. Various methodologies for chunking of text are known and can be employed at this step. The chunks are then embedded into vectors at step 120. Such vectors are lists of numbers that encode the meaning of the words in the chunk such that similar words or phrases have closer vector representations, making it easier to search a document to find chunks that may be relevant to a query. As noted above, the user request may have included a document that was uploaded and is then processed in this manner. Alternatively or additionally, as will be described in more detail below, the user request may relate to one or more documents that have previously been uploaded into the system. Such documents may have been previously processed with document parsing routine 112 or may have been uploaded but still need to be parsed to create searchable vectors representing the text therein.

The chat workflow routine 114 can begin with receipt of a user question at step 122 from the user request initiated at step 102. The text of the user question can be embedded into vectors and compared with the vectors generated from a document related to the request at step 124 (whether a document uploaded with the request or one or more previously uploaded documents). In embodiments, a scoring module can score the question vectors against the document vectors and the chunk relating to the document vector with the highest score is selected as being most relevant to the question at step 126. For example, the greater similarity that a question vector has with a document vector, the higher the score that document vector will have. A prompt containing both the user question and the selected chunk from the document can then be submitted to a large language model at step 128, such as, for example, as described in the '921 application, previously incorporated by reference above. The large language model can generate an output in response to the prompt at step 130 and the output from the model can be cleaned of the prompt to return a response to the user question at step 132.

There may also be circumstances where a user query requires use of a different model than that utilized by the document parsing routine 112 and chat workflow routine 114. For example, as will be described in more detail below, a Code Check feature of the chatbot system 100 may be available to aid the user in writing computer code. Due to the complexities of the model required to generate code in response to a user query, the model may be stored on a separate server 16. When the system 100 receives a query that requires use of a model stored on a separate server 16, a domain expertise routine 142 is executed. Domain expertise routine 142 is initiated when a domain expertise trigger is detected at step 144. The trigger can be detected by, for example, the user accessing a feature such as a Code Check feature that requires use of an additional, separately stored model. At step 146 a message containing the user query is sent to the server device 16 storing the model. The model executing on the server device 16 can process the query and return a response at step 148. The domain expertise routine 142 then processes the response to be returned to the user at step 150. It should be noted that while FIG. 1 depicts a single separate server 16 described as operating a separate model accessible by system 100, it should be understood that any number of separate devices running models providing a wide range of functions can be accessible to system in a similar manner. In addition, a single domain expertise routine can communicate with multiple servers as needed to process a given user query.

Once the response has been generated, the web server processing routine 106 can continue by determining whether the response from the model was provided in HTML (Hypertext Markup Language) or JSON (JavaScript Object Notation) format at step 134. If the response was provided in HTML format, at step 136 the web server can utilize a web framework to create fully rendered HTML including any inline CSS or JavaScript. Next, or if the response from the model was provided in JSON format, the web server can construct a valid HTTP (Hypertext Transfer Protocol) response at step 138 configured to be displayed on the user's web interface. This response is transmitted back to the computing device 12 and on to the user device 10 at step 140 for display on the user's web browser (or, alternatively, directly to the user device 10 where no intermediate computing device 12 is present). As will be discussed in more detail below, the response displayed to the user can include both the response generated by the model and the corresponding section of the document.

FIGS. 2-5 depict an example of a graphical user interface 200 for a chatbot for a document set interrogation tool. In embodiments, graphical user interface 200 can be displayed on a user device such as user device 10 in FIG. 1 for internal use by employees of a company, such as, for example, a bank.

Figure 2:
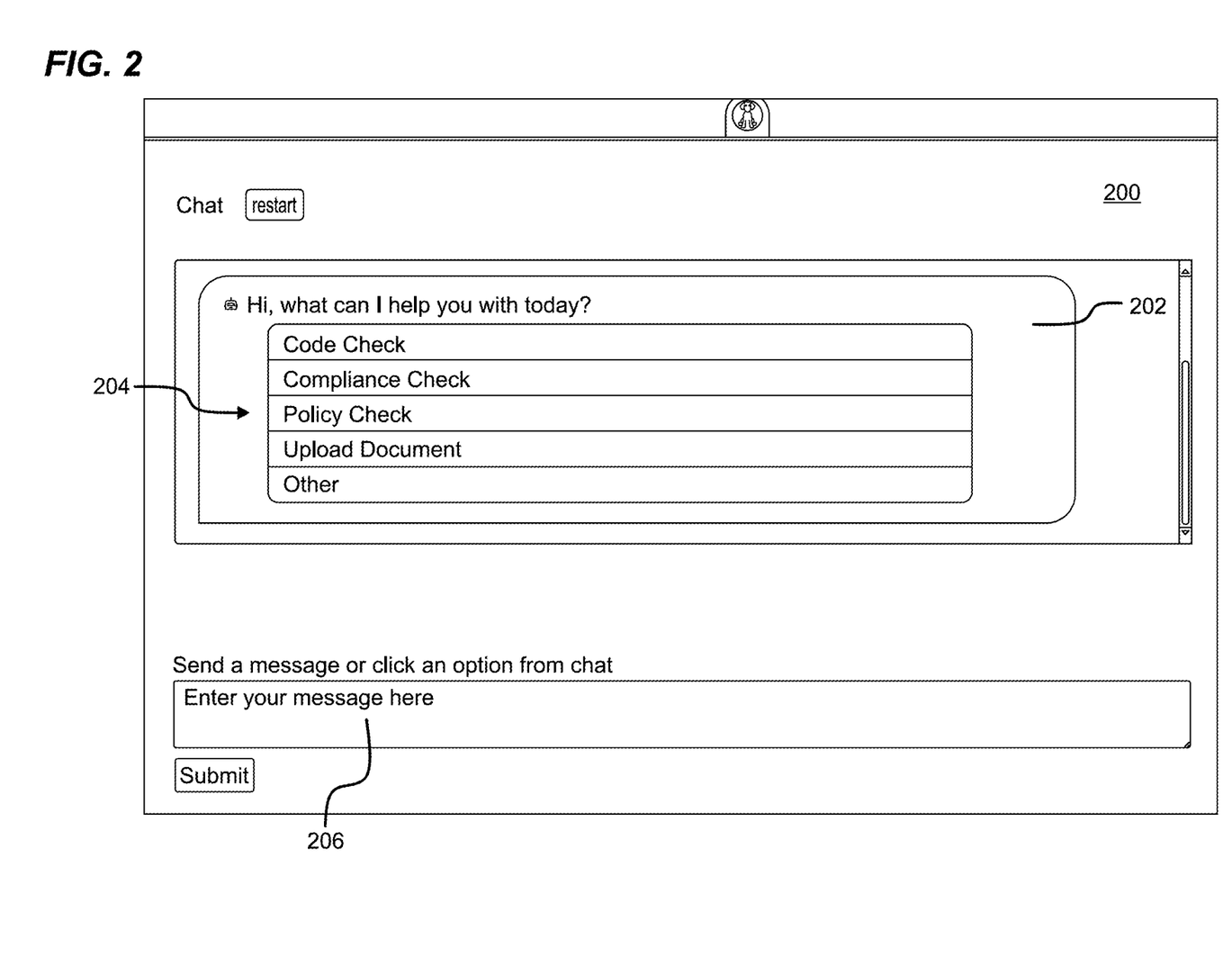
FIG. 2 depicts an example graphical user interface for a document interrogation tool of a computing device of the system of FIG. 1.

FIG. 2 depicts a help menu 202 from which a user can select a type of query from a list 204 of different types of queries that the system is enabled handle. These can include, for example, a Code Check, a Compliance Check, a Policy Check, an Upload Document item and an Other item. A Code Check can guide a user in generating computer code for a computer program the user is writing for the company. A Compliance Check enables a user to check to see whether an operation would comply with various rules and regulations relating to the business, such as, for example, various contractual provisions, government regulations, etc. A Policy Check enables a user to be provided with information pertaining to various company policies. The Upload Document item enables a user to upload a document in order to ask questions pertaining to a specific document that is not already in the system. The Other item can enable users to accomplish various other tasks for which the system is equipped. User Interface 200 can include a message box 206 that enables a user to submit a message to the system. Help menu 202 is displayed in a chat log 210 that can provide a history of a conversation between the user and the chatbot system.

Figure 3:
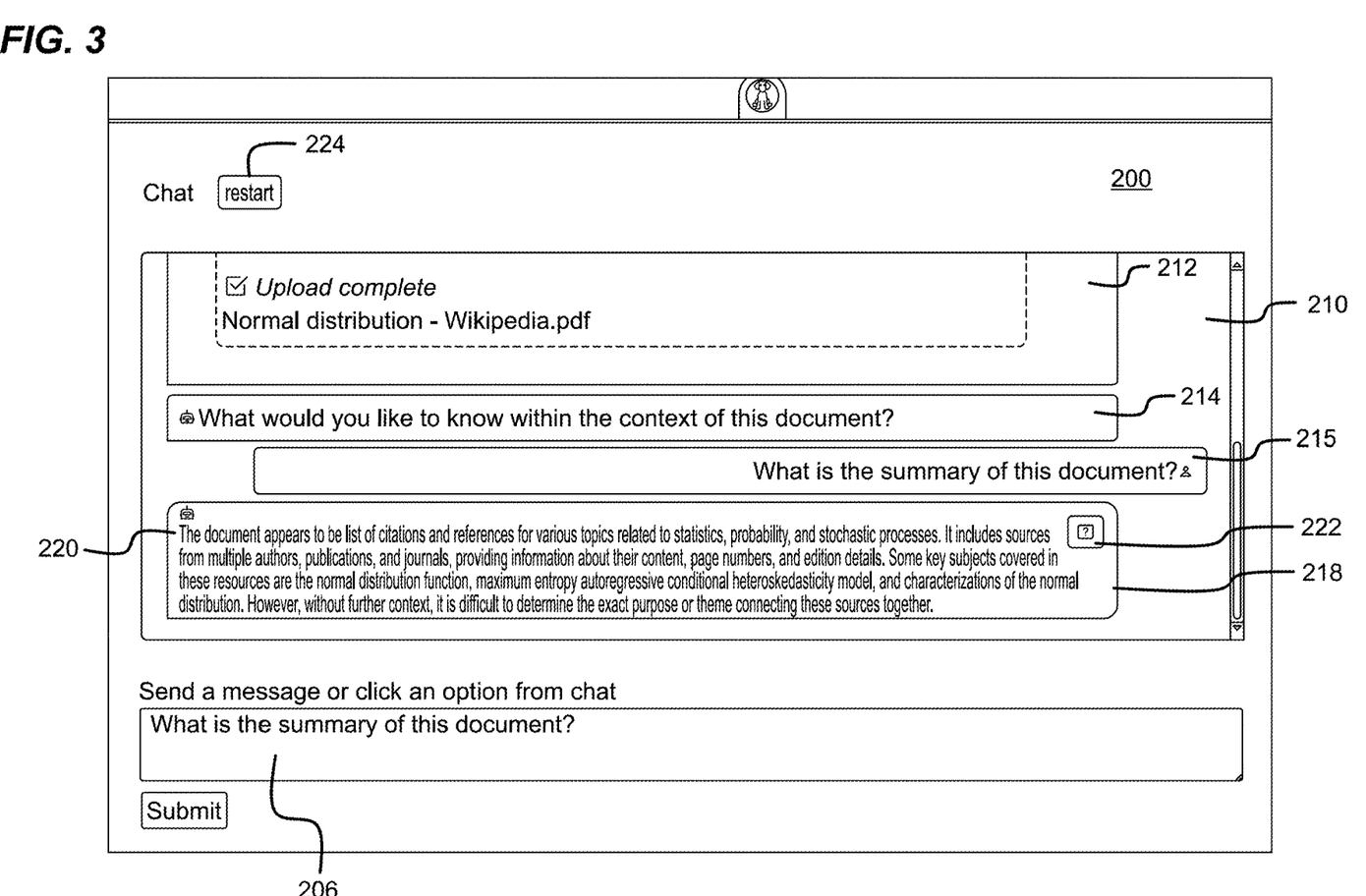
FIG. 3 depicts another example graphical user interface for a document interrogation tool of the computing device of FIG. 1.

For example, if the user has a question relating to a document, the user can select Upload Document from the list of queries 204 to follow prompts to upload a document into the system. Referring now to FIG. 3, after selecting Upload Document the user has uploaded a document and the chat log 210 displays an upload confirmation 212 confirming to the user that that document has been uploaded. A question prompt 214 may request that the user ask a question regarding the document and the user may enter a query 215 via the message box 206 that is then displayed in the chat log 210. The system will then process the uploaded document using the document parsing routine 112 of FIG. 1 and the parsed document and user query 216 are analyzed according to the chat workflow 114 to provide a response 218 to the user displayed on the user interface 200. In particular, the response 218 can include a prose response 220 answering the user's question and a selectable link 222 providing access to the portion of the document selected by the chat workflow 114 as being the highest scoring portion of the document responsive to the user's question. The user can select the link 222 to view the portion of the document to verify that the prose answer 220 is supported by the document and that the selected portion of the document is relevant to the user's question. If the user's question is satisfactorily answered by the response 220, the user may exit the session. If not, the user may ask one or more additional questions, upload additional documents, select another option from the help menu (e.g., by selecting the restart item 224), etc.

Figure 4:
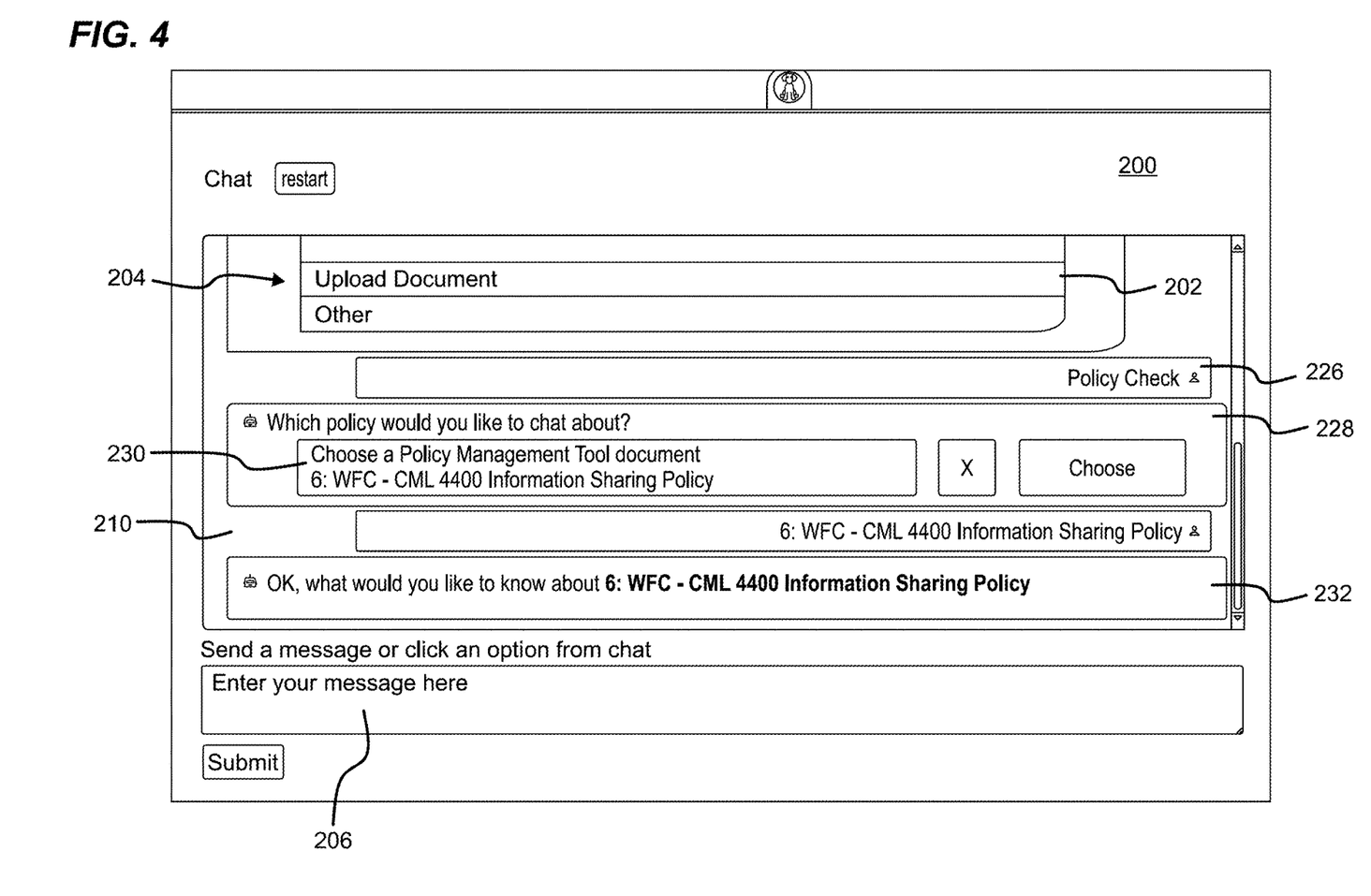
FIG. 4 depicts another example graphical user interface for a document interrogation tool of the computing device of FIG. 1.

FIG. 4 depicts an example user interface 200 after a user has selected the Policy Check item from the list of queries 204 in the help menu 202. In response to this selection, the system can display a Policy Check item 226 in the chat log 210 confirming the user's selection and provide a selection prompt 228 to prompt the user to provide a specific policy about which the user has one or more questions. The user can enter a name of a policy, subject matter of a policy, etc. via message box 206 and the chat log 210 can then display one or more policies that may be relevant. In the depicted example, the user has only been provided with one policy 230 to choose from, but in other embodiments there may be a plurality of displayed policies from which the user can choose. After the user chooses a policy, the chat log 210 can display a confirmation 232 of the policy that will be searched, and the user can enter a question about the policy in the message box 206.

Although not further depicted, the system can then process the user's query according to the chat workflow 114 described above to provide a response similar to the response 220 depicted in FIG. 3. Because the policy in FIG. 3 is already in the system, the document parsing workflow 112 may have already been carried out with regard to the document. However, if the document has not previously been queried, is new to the system, etc. the document may also be processed according to the document parsing workflow 112. Following the response, the user may ask one or more additional questions, upload additional documents, select another option from the help menu (e.g., by selecting the restart item 224), etc. It should be noted that while this embodiment is described as responding to a user query relating to a single, specific policy, that embodiments are contemplated that can be applied to a group of related policies, a database of general policies, etc. Although not specifically depicted herein, when a user selects the Compliance Check item from the help menu 202, the chat will proceed in a similar manner. Chatbot may search one or more contracts, government documents, etc. to determine compliance with one or more rules and regulations based on a user question.

Figure 5:
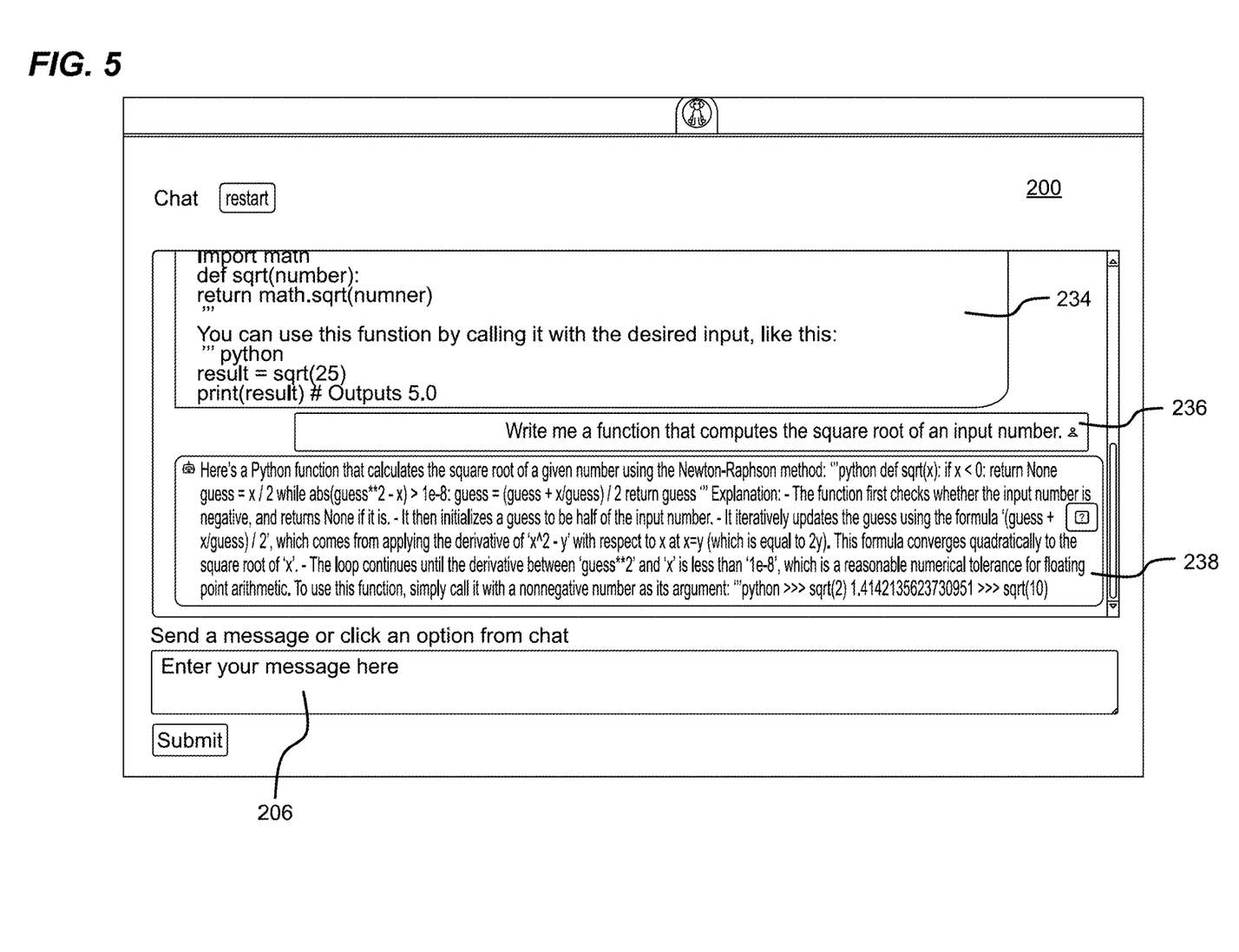
FIG. 5 depicts another example graphical user interface for a document interrogation tool of the computing device of FIG. 1.

FIG. 5 depicts an example user interface after a user has selected the Code Check item from the help menu 202. The user may initially submit a query (not pictured) relating to an aspect of information needed for writing an element of computer code. For example, if the user asked for information pertaining to computing the square root of an input number, the system may display responsive information 234 in the chat log 210. A user may alternatively or additionally use message box 206 to request that the system provide a function for use in computer coding as depicted in query 236. A response 238 can be provided, which may provide both the function in one or more programming languages, such as, for example, Python, as well as an explanation of how the function operates. In implementing the Code Check aspect of the chatbot, the system may function differently from the chat workflow 114 described above as there may not be a "document" to which the query would be compared. Rather, the query may be processed by a large language model capable of using text prompts to generate code. In embodiments, this may be a different large language model than that described above with regard to chat workflow 114. As described above with reference to FIG. 1, submission of a query using the Code Check feature can trigger a domain expertise routine in which the system accesses a separate device storing the model for generating the response. However, these processing functions occur on the backend and the user interacts with the user interface in the same manner as the other features described above. In addition to code generation, such systems can also be employed for error detection in previously drafted code.

As described and depicted in FIGS. 2-5, the system disclosed herein can provide a menu of items from which the user can select a category and then submit a query related to the category. However, in other embodiments the user can submit a query and the system can then process the query to determine a category to which the query belongs. The chatbot workflow can then proceed as described herein.

Although described herein with regard to particular types of documents and large language models, it should be understood that the systems and methods disclosed herein can be applied to any type of document and could utilize any current or future large language models. These systems and methods can also be extended to other media, such as images, audio or video. The systems and methods disclosed herein can also be used across multiple different languages.

Although the systems and methods are primarily described herein for use by employees such as those of a bank, it should be understood that in other embodiments the systems and methods can be employed in other employment areas and outside of the employment context, such as for use by a customer of a business. In addition, within the employment context, the systems and methods can be adapted to provide different prompts and/or different responses for employees having different roles within the company to customize the prompts and/or response to the specific roles and functions that a given type of employee provides for the company.

Figure 6:
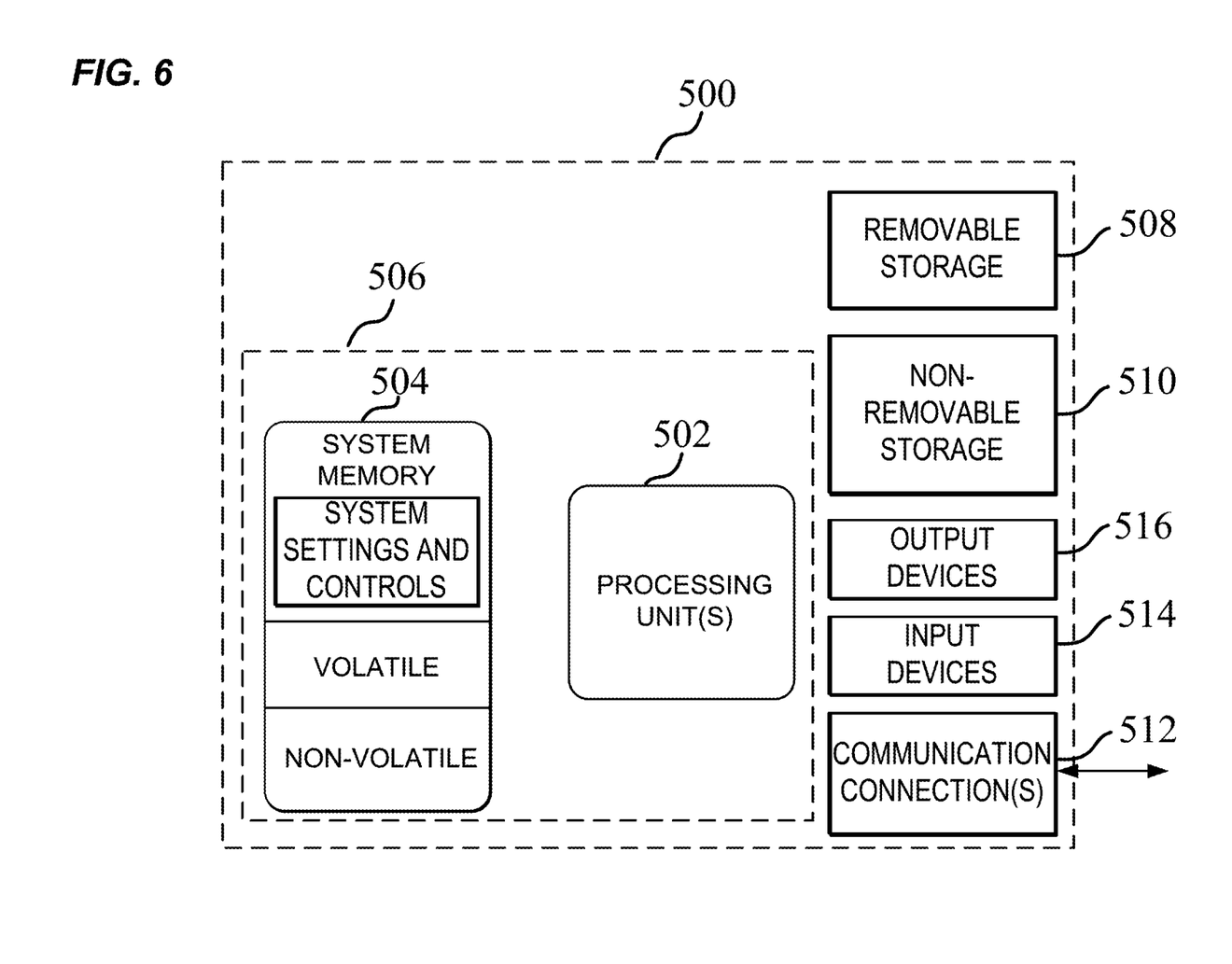
FIG. 6 depicts an example block diagram of a virtual or physical operating environment of the computing device of FIG. 1.

FIG. 6 depicts one example of a suitable operating environment 500 in which one or more of the present examples can be implemented, as referred to above with respect to FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In its most basic configuration, operating environment 500 typically includes at least one processing unit 502 and memory 504. Depending on the exact configuration and type of computing device, memory 504 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 6 by dashed line 506. Further, operating environment 500 can also include storage devices (removable, 508, and/or non-removable, 510) including, but not limited to, magnetic or optical disks or tape. Similarly, environment 500 can also have input device(s) 514 such as touch screens, keyboard, mouse, pen, voice input, etc., and/or output device(s) 516 such as a display, speakers, printer, etc. Also included in the environment can be one or more communication connections 512, such as LAN, WAN, point to point, Bluetooth, RF, etc.

Operating environment 500 typically includes at least some form of computer readable media. Computer readable media can be any available media that can be accessed by processing unit 502 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 500 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by operating environment 500 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, operating environment 500 is part of a network that stores data in remote storage media for use by the operating environment 500.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method comprising:
    receiving a query via a user interface associated with a chatbot system configured to provide information relating to compliance with rules or regulations;
    detecting a domain expertise trigger based upon the query using a specialized model feature for generating a response;
    embedding text of the query into one or more vectors such that similar words or phrases have closer vector representations;
    comparing the one or more vectors from the query with one or more vectors generated from a document;
    generating a score for the one or more vectors generated from the document based on a relevance of the one or more vectors generated from the document to the one or more vectors from the query;
    selecting a chunk of the document based on the comparing, where the selecting of the chunk of the document includes selecting the chunk including a vector having a highest score;
    constructing a prompt to a large language model including the query and the chunk of the document;
    routing, based upon the domain expertise trigger, the query to a separate server device storing a domain-specific model of the large language model;
    receiving the response to the prompt from the large language model, wherein the response includes an answer to the query and a relevant section of the document; and
    presenting the response on the user interface along with the chunk of the document, including:
        presenting an icon representing the document on the user interface adjacent to the response; and
        displaying text of the chunk upon receiving selection of the icon.

2. The method of claim 1, further comprising receiving an upload of the document along with the query.

3. The method of claim 2, further comprising:
    parsing the document into text;
    splitting the text into chunks; and
    embedding the chunks into the one or more vectors generated from the document.

4. The method of claim 1, further comprising retrieving the document from a database of documents.

5. A system comprising:
    a processor; and
    a computer-readable medium storing instructions that, when executed by the processor, cause the system to:
        receive a query via a user interface associated with a chatbot system configured to provide information relating to compliance with rules or regulations;
        detect a domain expertise trigger based upon the query using a specialized model feature for generating a response;
        embed text of the query into one or more vectors such that similar words or phrases have closer vector representations;
        compare the one or more vectors from the query with one or more vectors generated from a document;
        generate a score for the one or more vectors generated from the document based on a relevance of the one or more vectors generated from the document to the one or more vectors from the query;
        select a chunk of the document based on the comparison, where selection of the chunk of the document includes selecting the chunk including a vector having a highest score;
        construct a prompt to a large language model including the query and the chunk of the document;
        route, based upon the domain expertise trigger, the query to a separate server device storing a domain-specific model of the large language model;
        receive the response to the prompt from the large language model, wherein the response includes an answer to the query and a relevant section of the document; and
        present the response on the user interface along with the chunk of the document, including to:
            present an icon representing the document on the user interface adjacent to the response; and
            display text of the chunk upon receiving selection of the icon.

6. The system of claim 5, comprising further instructions that, when executed by the processor, cause the system to be configured to receive an upload of the document along with the query.

7. The system of claim 6, comprising further instruction that, when executed by the processor, cause the system to:

parse the document into text;
split the text into chunks; and
embed the chunks into the one or more vectors generated from the document.

8. The system of claim 7, comprising further instructions that, when executed by the processor, cause the system to retrieve the document from a database of documents.

\* \* \* \* \*

UNITED STATES PATENT AND TRADEMARK OFFICE
CERTIFICATE OF CORRECTION

| | | |
|---|---|---|
| PATENT NO. | : 12,450,292 B2 | Page 1 of 1 |
| APPLICATION NO. | : 18/601102 | |
| DATED | : October 21, 2025 | |
| INVENTOR(S) | : Arefaine et al. | |

It is certified that error appears in the above-identified patent and that said Letters Patent is hereby corrected as shown below:

In the Claims

Column 9, Line 61, Claim 1: delete "query:" and insert --query;--

Signed and Sealed this
Sixteenth Day of December, 2025

John A. Squires
*Director of the United States Patent and Trademark Office*